United States Patent
Kuo et al.

(10) Patent No.: US 7,314,901 B2
(45) Date of Patent: *Jan. 1, 2008

(54) POLYPROPYLENE FILMS

(75) Inventors: Jeffrey Wen-Cheng Kuo, Seabrook, TX (US); Kenneth Lewtas, Tervurn (BE); William Moa-Tseng Chien, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/747,425

(22) Filed: Dec. 29, 2003

(65) Prior Publication Data

US 2004/0170854 A1    Sep. 2, 2004

(51) Int. Cl.
  *C08F 8/00*    (2006.01)
  *C08L 23/00*   (2006.01)
  *C08L 23/04*   (2006.01)
(52) U.S. Cl. ..................... 525/191; 525/240
(58) Field of Classification Search ............ 525/191, 525/240
See application file for complete search history.

(56) References Cited

U.S. PATENT DOCUMENTS

| 5,667,902 A | 9/1997 | Brew et al. ............ 428/518 |
| 5,994,482 A * | 11/1999 | Georgellis et al. ............ 526/65 |
| 6,485,817 B1 | 11/2002 | DeMeuse ................ 428/213 |
| 6,747,114 B2 * | 6/2004 | Karandinos et al. ..... 526/348.2 |
| 6,777,067 B1 * | 8/2004 | Speith-Herfurth et al. .. 428/220 |
| 2003/0049436 A1 * | 3/2003 | Hager et al. ............. 428/343 |
| 2004/0249046 A1 * | 12/2004 | Abhari et al. ............. 524/474 |

FOREIGN PATENT DOCUMENTS

| WO | WO 98/04403 | 2/1998 |
| WO | WO 98/41571 | 9/1998 |
| WO | WO 01/40358 | 6/2001 |

\* cited by examiner

*Primary Examiner*—Nathan M. Nutter

(57) ABSTRACT

Films disclosed herein contain a base or core layer comprising a first polypropylene, a second polypropylene, and a hydrocarbon resin. The base layers may also include other additives as described below. The first polypropylene is preferably a high crystallinity polypropylene having a melting point above about 155° C. or a polypropylene having a polydispersity (Mw/Mn) greater than about 4.0. The second polypropylene may be any conventional polypropylene, preferably having a melting point below about 160° C. and/or a polydispersity less than about 5.0.

19 Claims, No Drawings

POLYPROPYLENE FILMS

Background references include U.S. Pat. Nos. 5,667,902, 6,485,817, WO 98/04403, WO 98/41571, and WO 01/40358.

Films disclosed herein contain a base or core layer comprising a first polypropylene, a second polypropylene, and a hydrocarbon resin. The base layers may also include other additives as described below. The first polypropylene is preferably a high crystallinity polypropylene having a melting point above about 155° C. or a polypropylene having a polydispersity (Mw/Mn) greater than about 4.0. The second polypropylene may be any conventional polypropylene, preferably having a melting point below about 160° C. and/or a polydispersity less than 5.0. A suitable base layer will have the following materials in the following preferred ranges:

First polypropylene: about 2-50 wt %, more preferably about 5-45 wt %, more preferably about 5-40 wt %, more preferably about 5-35 wt %, more preferably about 5-30 wt %, more preferably about 5-25 wt %, more preferably about 5-20 wt %, more preferably about 5-15 wt % and more preferably about 10-15 wt %. Other preferred ranges include any combination of any upper and any lower limit and/or combinations of two upper or two lower limits. As used herein, the term about, when appearing before a range applies to both the upper and lower limit.

Hydrocarbon Resin: about 2-50 wt %, more preferably about 5-45 wt %, more preferably about 5-40 wt %, more preferably about 5-35 wt %, more preferably about 5-30 wt %, more preferably about 5-25 wt %, more preferably about 5-20 wt %, more preferably about 5-15 wt % and more preferably about 10-15 wt %. Other preferred ranges include any combination of any upper and any lower limit and/or combinations of two upper or two lower limits.

Second Polypropylene: less than about 96 wt %, more preferably about 5-95 wt %, more preferably about 5-90 wt %, more preferably about 10-90 wt %, more preferably about 20-90 wt %, more preferably about 30-90 wt %, more preferably about 40-90 wt %, more preferably about 50-90 wt %, more preferably about 60-90 wt %, and more preferably about 70-90 wt %. Other preferred ranges include any combination of any upper and any lower limit and/or combinations of two upper or two lower limits.

Additives, as discussed below, may be present in an amount between about 0.05-40 wt %.

One embodiment of the first polypropylene is a high crystallinity polypropylene having a melting point preferably above about 155° C., more preferably above about 156° C., more preferably above about 157° C., more preferably above about 158° C., more preferably above about 159° C., more preferably above about 160° C., more preferably above about 161° C., more preferably above about 162° C., more preferably above about 163° C., more preferably above about 164° C., and more preferably above about 165° C. Preferred high crystallinity polypropylenes have melting point ranges between any of the values listed above and including a preferred range between about 155° C.-170° C., more preferably between about 163° C.-170° C., and more preferably between about 165° C.-170° C. Melting point is the peak melting point determined by ASTM D-3417. Examples of this type of polypropylene include ACCPRO™ 9117 available from BP Amoco, Fina PP 3270 available from AtoFina, and ESCORENE™ PP1043N available from ExxonMobil Chemical Company.

The high crystallinity polypropylene preferably has non-crystalline portion of less than 2% measured by Crystallization Analysis Fractionation (CRSTAF) using an instrument made by Polymer Char Corp. of Paterna, Spain. In determining the non-crystalline portion, the polypropylene is dissolved in trichlorobenzene at 160° C. The polymer solution concentration is monitored during step-wise temperature reduction from 100° C. down to 30° C. Aliquots of the solution are filtered and analyzed by a concentration detector to measure quantity of the precipitated polypropylene. As the temperature decreases, the most crystalline fractions, composed of molecules with zero or very few chain defects (or highest crystallinity), will precipitate first. This is followed by precipitation of polypropylene with more chain defects. The last data point taken at 30° C. represents the non-crystalline fraction or soluble fraction.

Another embodiment of the first polypropylene is a polypropylene having a polydispersity greater than about 4.0, more preferably greater than about 4.5, more preferably greater than about 5.0, more preferably greater than about 5.5, more preferably greater than about 6.0, more preferably greater than about 6.5, more preferably greater than about 7.0. Preferred ranges include between about 5.0-11.0, more preferably between about 6.0-10.0, and more preferably between about 7.0-10.0. Preferred ranges also include any combination of limits expressed in this paragraph. Examples of this type of polypropylene include ACCPRO™ 9117 and 9346 available from BP Amoco.

The first polypropylene preferably has a heptane insoluble amount of greater than about 95%, more preferably greater than about 96%, more preferably greater than about 97%, more preferable greater than about 98%, and more preferably greater than about 99%. Heptane insolubles is measured as follows. About 1.3 grams of grounded polypropylene pellets are placed in a thimble and refluxed in heptane for 1.5 hours. The undissolved PP is dried in a vacuum oven at 100° C. for 40 minutes and weighed. The heptane insoluble measurement is the weight percent of undissolved polypropylene based on the weight of the ground polypropylene pellets.

The first polypropylene preferably has a melt flow rate of less than about 20, more preferably less than about 15, more preferably less than about 10, more preferably less than about 9, more preferably less than about 8, more preferably less than about 7, more preferably less than about 6, and more preferably less than about 5.

The first polypropylene may include combinations of one or more of the previously described polypropylenes having one or more of the preferred melting points, polydispersities, CRYSTAF solubles, or heptane insolubles. The first polypropylene may be a single polypropylene material or a combination of two or more materials.

Examples of resins include aliphatic hydrocarbon resins, hydrogenated aliphatic hydrocarbon resins, aliphatic/aromatic hydrocarbon resins, hydrogenated aliphatic aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, polyterpene resins, terpene-phenol resins, rosins and rosin esters, hydrogenated rosins and rosin esters, and mixtures of two or more thereof. As used herein hydrogenated, when referring to the resin, includes fully, substantially and at least partially hydrogenated resins. Suitable aromatic resins include aromatic modified aliphatic resins, aromatic modified cycloaliphatic resin, and hydrogenated aromatic hydrocarbon resins having an aromatic content of 1-30%, more preferably 1-20%, more preferably 1-5%, and more preferably less than 1 wt %. Any of the above resins may be grafted with an unsaturated ester or anhydride to provide enhanced properties to the resin. Examples of grafted resins and their manufacture are described in PCT Applications PCT/EP02/10794, PCT/EP02/10795, PCT/EP02/10796 and PCT/EP02/10686 which are incorporated herein by reference for U.S. purposes.

Resins suited for use as described herein include EMPR 100, 101, 102, 103, 104, 105, 106, 107, 108, 109, 110, 116, 117, and 118 resins, OPPERA™ resins, and EMFR resins available from ExxonMobil Chemical Company, ARKON™ P140, P125, P115, M115, and M135 and SUPER ESTER™ rosin esters available from Arakawa Chemical Company of Japan, SYLVARES™ polyterpene resins, styrenated terpene resins and terpene phenolic resins available from Arizona Chemical Company, SYLVATAC™ and SYLVALITE™ rosin esters available from Arizona Chemical Company, NORSOLENE™ aliphatic aromatic resins available from Cray Valley of France, DERTOPHENE™ terpene phenolic resins and DERCOLYTE™ polyterpene resins available from DRT Chemical Company of France, EASTOTAC™ resins, PICCOTAC™ resins, REGALITE™ and REGAL-REZ™ hydrogenated cycloaliphatic/aromatic resins available from Eastman Chemical Company of Kingsport, Tenn., WINGTACK™ resins available from Goodyear Chemical Company, PICCOLYTE™ and PERMALYN™ polyterpene resins, rosins and rosin esters available from Hercules (now Eastman Chemical Company), coumerone/indene resins available from Neville Chemical Company, QUINTONE™ acid modified $C_5$ resins, $C_5/C_9$ resins, and acid modified $C_5/C_9$ resins available from Nippon Zeon of Japan, CLEARON™ hydrogenated terpene resins available from Yasuhara. The preceding examples are illustrative only and by no means limiting. Preferred resins have softening points between about 80° C.-180° C., more preferably about 120° C.-150° C., more preferably about 125° C.-140° C. Softening point (° C.) is preferably measured as a ring and ball softening point according to ASTM E-28 (Revision 1996).

The second polypropylene used in the base or core layer may comprise any conventional polypropylene homo- or co-polymer. In some embodiments, the second polypropylene may be the same material as the first polypropylene. Preferred polypropylenes have a polydispersity less than about 5.0, more preferably less than about 4.5 and more preferably less than about 4.0. Preferred polypropylenes also have melting points less than about 160° C., more preferably less than about 159° C., more preferably less than about 158° C., more preferably less than about 157° C., more preferably less than about 156° C., more preferably less than about 155° C., more preferably less than about 154° C., more preferably less than about 153° C., more preferably less than about 152° C., more preferably less than about 151° C., more preferably less than about 150° C., more preferably less than about 149° C., more preferably less than about 148° C., more preferably less than about 147° C., more preferably less than about 146° C., more preferably less than about 145° C. Preferred polypropylenes for use as the second polypropylene include ESCORENE™ PP4712E1, PP4792E1, AND PP4772 available from ExxonMobil Chemical Company.

The base or core film layer may be obtained from a masterbatch composition containing both a first polypropylene and a resin. Suitable masterbatches can be produced by conventional methods such as compounding in a twin screw extruder, Banbury mixer, and other conventional methods known in the art. The masterbatch generally contains resin in an amount between 10-90 wt %, more preferably 20-80 wt %, more preferably 30-70 wt %, more preferably 40-60 wt % and contains a first polypropylene in an amount between 10-90 wt %, more preferably 20-80 wt %, more preferably 30-70 wt %, more preferably 40-60 wt %. The masterbatch may optionally contain up to 60 wt % additives as described herein. Processes for producing conventional masterbatches may be found in EP 288 227 A and WO 00/56806 which are hereby incorporated by reference for United States purposes.

Preferred embodiments of masterbatches include:
  (1) 30-70 wt %, more preferably 40-60 wt %, and most preferably 50 wt % of a hydrogenated thermally polymerized dicyclopentadiene hydrocarbon resin having a softening point between 120° C. and 150° C., for example a softening point of about 125° C. or about 140° C., and
  (2) 30-70 wt %, more preferably 40-60 wt %, and most preferably 50 wt % of a polypropylene selected from:
    (a) polypropylene having a melting point between about 163-170° C., more preferably between about 165° C.-170° C.;
    (b) polypropylene having a polydispersity between about 6-11, more preferably between about 7-10;
    (c) polypropylene having greater than about 96% heptane insolubles;
    (d) polypropylene meeting two or more (a)-(c); and
    (e) combinations of two or more of (a)-(d).

The masterbatch may be prepared by melt mixing all components in an extruder or Banbury mixer. The components may be dry-blended together before discharge into the extruder or Banbury mixer, or they can be fed separately in separate feed hoppers. The extruder can be a twin-screw or single-screw extruder with single feed hopper or preferably multiple feed hoppers. The extrudate can be cut into pellets using strand cut or circular die/underwater cut. The preferred melt mixing device is twin-screw extruder. Preferably, the first polypropylene is fed at beginning of the extruder. The resin is preferably melted, and then added at a point where the first polypropylene is substantially in the molten state.

In masterbatch embodiments comprising a high crystallinity polypropylene and resin, conventional masterbatch production conditions are not preferred because of problems such as cluster pelleting and knife wrapping. While not wishing to be bound by any theory, it is believed that these problems are due to lower amorphous content and faster crystallization rates of the high crystallinity polypropylene that may exclude more resin in the surface of the pellet. One normal practice to resolve this problem is to increase the melt temperature, die temperature or cooling water temperature, which unfortunately, decreases production rates. Surprisingly, we found the best way to achieve good pelletizing is to instead increase the production rate by as much as 20% (at least 5%, more preferably at least 10%) over conventional production rates for polypropylene/resin masterbatch blends. This increases production rates. It is believed that the increase in production rates reduces crystallization of the polypropylene, hence less exclusion of the resin. In addition, the increased rate allows for larger masterbatch pellet size, which may also reduce the surface to volume ratio, hence less quenching of the pellets.

The masterbatch can be added to polyolefins and additives during the process of making films using the methods disclosed herein. The masterbatch may also be added downstream from the other components using a side-feeder to the extruder. The processing temperatures should be lower than without addition of masterbatch to achieve better mixing and extrudate uniformity. Typically, the degree of temperature reduction depends on the amount of masterbatch and the equipment.

Films

Films having one or more layers comprising the compositions disclosed herein may be employed as either mono- or multi-layer films or laminates and may be manufactured by any conventional process, including simple bubble extrusion, biaxial orientation processes (such as tenter frames or double bubble processes), simple cast/sheet extrusion-lamination, co-extrusion, lamination, extrusion coating, and co-extrusion coating, blowing and casting, etc. Should a multilayer film be desired, such may be obtained from a monolayer blown or cast film that can be combined with the other layers though conventional techniques such as adhesive lamination or extrusion lamination. Monolayer and coextruded films can also be produced by biaxial orientation processes. Extrusion coating is another suitable process. A heat-sealable film comprising a sealing layer as described herein may be extrusion coated onto a substrate either in the form of a monolayer or a multi-layer co-extruded substrate. A multi-layer extrudate can be produced via multiple extruders on multi-station tandem lines. The layers may be coextruded with other layer(s) of a multi-layer film or the sealing layer can be laminated onto another layer(s) or substrate, including paper, foil, oriented polypropylene, polyamides, polyesters, polyethylene homo- and co-polymers, polyethylene terephthalate, metal and metallized substrates and other substrates discussed herein. The films may be cavitated with an inert material such as calcium carbonate or PBT to form a white or opaque film.

The film may be obtained by the flat film or tubular process which may be followed by orientation in an uniaxial direction or in two mutually perpendicular directions in the plane of the film. One or more of the layers of the film may be oriented in the transverse and/or longitudinal directions to the same or different extents. This orientation may occur before or after the individual layers are brought together. For example a polyethylene layer can be extrusion coated or laminated onto an oriented polypropylene or oriented polyester layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15 preferably 7 to 9. The film may be oriented to the same extent in both the MD and TD directions.

Other preferred layers can be paper, wood, cardboard, metal, metal foils (such as aluminum foil and tin foil), metallized surfaces, glass (including silicon oxide ($SiO_x$) coatings applied by evaporating silicon oxide onto a film surface), fabric, spunbonded fibers, and non-wovens (particularly polypropylene spun bonded fibers or non-wovens), and substrates coated with inks, dyes, pigments, PVC and the like.

The films may vary in thickness depending on the intended application, however films of a thickness from about 1-250 μm are usually suitable. Films intended for packaging are usually from about 10-60 μm thick. In many cases, the sealing layer will have a thickness between about 5-30 μm, more preferably between about 1-6 μm, and most preferably between about 0.05-3 μm. There may be a sealing layer on both the inner and outer surfaces of the film or the sealing layer may be present on only the inner or the outer surface. In some circumstances there is no extra sealing layer and good sealing characteristics may be obtained by surface modification (which may or may not involve some surface polymer degradation).

Film additives such as cling agents, antiblock agents, antioxidants, slip additives, pigments, fillers, processing aids, UV stabilizers, neutralizers, lubricants, surfactants and/or nucleating agents may also be present in one or more than one layer in the films. Preferred additives include silicon dioxide, titanium dioxide, polydimethylsiloxane, talc, dyes, wax, calcium stearate, carbon black, low molecular weight resins and glass beads.

Preferred antioxidants include phenolic antioxidants, such as Irganox 1010, Irganox, 1076 and Irgfos 168 available from Ciba-Geigy and 3,5 tertiary-butyl 4-hydroxy toluene. Preferred oils include paraffinic or napthenic oils such as Primol 352, or Primol 876 available from ExxonMobil Chemical France, S.A. in Paris, France. More preferred oils include aliphatic napthenic oils, white oils or the like.

Preferred film processing aids, lubricants, waxes, and/or oils include low molecular weight products such as wax, oil or low Mn polymer, (low meaning below Mn of 5000, preferably below 4000, more preferably below 3000, even more preferably below 2500). Preferred waxes include polar or non-polar waxes, functionalized waxes, polypropylene waxes, polyethylene waxes, and wax modifiers. Preferred waxes include ESCOMER™ 101. Preferred low Mn polymers include polymers of lower alpha olefins such as propylene, butene, pentene, hexene and the like. A particularly preferred polymer includes polybutene having an Mn of less than about 1000.

In another embodiment one more layers may be modified by corona treatment, electron beam irradiation, gamma irradiation, flame treatment or microwave. In a preferred embodiment one or both of the surface layers is modified by corona treatment.

The films described above may be used as films for packaging, i.e., packaging of consumer goods (compact discs, video cassettes, digital video discs (DVD), candy and/or cigarette wrapping). In such applications, the films disclosed herein: (i) improve the processing for the film manufacturers because it results in lower power requirements and lower temperatures to stretch the film during the orientation process and (ii) improve strength, shrinkage, and/or stiffness which allows surface contouring with aesthetically pleasing sharp edges and corners. In candy wrapping, the films give good twist retention. Increased stiffness allows further downgauging of the film, which is environmentally advantageous and lowers overall costs. Improvement in barrier properties is noticed, which enables flavor, moisture, oxygen etc. transmission to be significantly reduced. When compared to films incorporating no resin, the disclosed films also show improvement in optical qualities, such as haze, and yield lower heat seal initiation temperatures-allowing for increased packaging rates.

The invention claimed is:

1. A film containing a layer comprising:
   (a) about 2-50 wt % of a polypropylene having:
       (i) a melting point greater than about 155° C.;
       (ii) a polydispersity greater than about 4; and
       (iii) greater than about 96% heptane insolubles;
   (b) about 2-50 wt % of a hydrocarbon resin;
   (c) less than about 96 wt % of a polypropylene having a melting point below 160° C.; and
   (d) optionally, about 0.05-40 wt % of one or more additives.

2. A masterbatch for use in making a film consisting essentially of about 10-90 wt % hydrocarbon resin and about 10-90 wt % polypropylene wherein the polypropylene has greater than about 96% heptane insolubles, a melting point greater than about 155° C. and a polydispersity of greater than about 4.

3. A process for the production of oriented polypropylene films comprising blending a polypropylene having a melting point greater than about 155° C. and a hydrocarbon resin to form an masterbatch containing from 10 to 90 wt % of the resin and subsequently blending the masterbatch with additional polypropylene and extruding the resultant blend to form a film, wherein the polypropylene in the masterbatch has:

(a) a melting point greater than about155° C.;
(b) a polydispersity greater than about 4; and
(c) polypropylene having greater than about 96% heptane insolubles.

4. The process according to claim 3 comprising blending the resin and polypropylene under high shear conditions to form the masterbatch.

5. The masterbatch of claim 2 wherein the masterbatch is prepared by mixing in an extruder.

6. The masterbatch of claim 2 wherein the masterbatch comprises 30-70 wt % polypropylene.

7. The masterbatch of claim 2 wherein the masterbatch comprises 40-60 wt % polypropylene.

8. The masterbatch of claim 2 wherein the hydrocarbon resin comprises a hydrogenated thermally polymerized dicyclopentadiene hydrocarbon resin.

9. The masterbatch of claim 8 wherein the hydrocarbon resin has a softening point between 120° C. and 150° C.

10. The masterbatch of claim 9 wherein the hydrocarbon resin has a softening point between 125° C. and 140° C.

11. The masterbatch of claim 2 wherein the polypropylene has a polydispersibility of from about 6-11.

12. The masterbatch of claim 11 wherein the polypropylene has a polydispersibility of from about 7-10.

13. The masterbatch of claim 2 wherein the polypropylene has a melting point of from about 163° C.-170° C.

14. The masterbatch of claim 13 wherein the polypropylene has a melting point of from about 165° C.-170° C.

15. The masterbatch of claim 2 wherein the masterbatch is prepared by mixing in a Banbury mixer.

16. The masterbatch of claim 2 wherein the masterbatch comprises 30-70 wt % hydrocarbon resin.

17. The masterbatch of claim 2 wherein the masterbatch comprises 40-60 wt % hydrocarbon resin.

18. A masterbatch for use in making a film comprising about 10-90 wt % hydrocarbon resin and about 10-90 wt % polypropylene having:

(a) a melting point of from about 163° C.-170° C.;
(b) a polydispersity greater than about 4; and
(c) polypropylene having greater than about 96% heptane insolubles.

19. A masterbatch for use in making a film comprising about 10-90 wt % hydrocarbon resin and about 10-90 wt % polypropylene having:

(a) a melting point of from about 165° C.-170° C.;
(b) a polydispersity greater than about 4; and
(c) greater than about 96% heptane insolubles.

* * * * *